Figure 1:
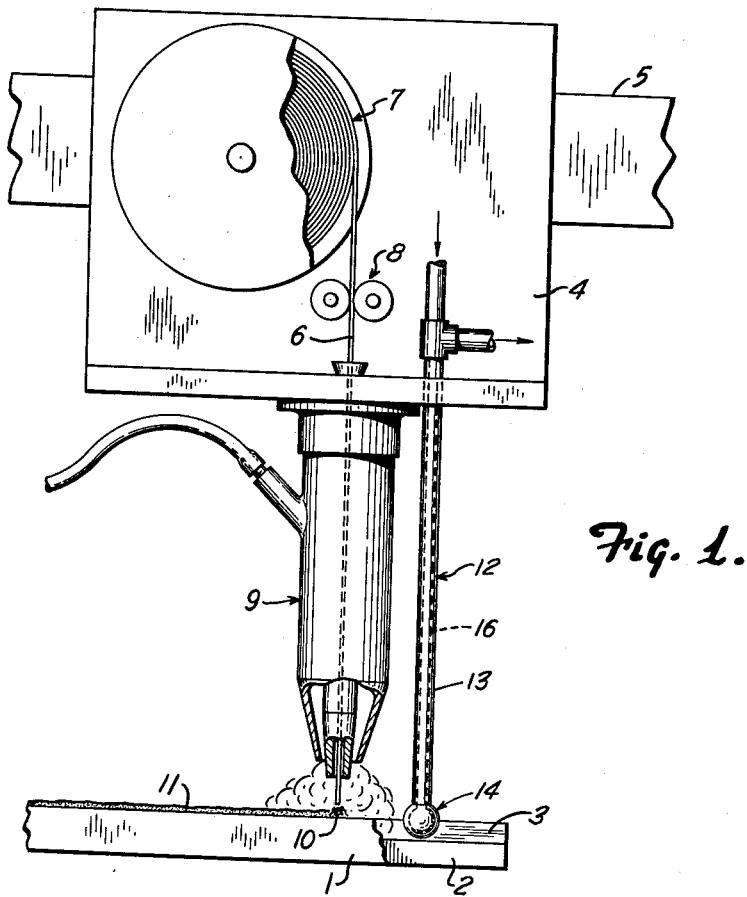

March 5, 1963

J. J. CHYLE 3,080,472

AUTOMATIC WELD UNIT CONTROL

Filed July 21, 1961

INVENTOR.
John J. Chyle
BY
Andrus & Starke
Attorneys

United States Patent Office 3,080,472
Patented Mar. 5, 1963

3,080,472
AUTOMATIC WELD UNIT CONTROL
John J. Chyle, Wauwatosa, Wis., assignor to A. O. Smith Corporation, Milwaukee, Wis., a corporation of New York
Filed July 21, 1961, Ser. No. 125,739
6 Claims. (Cl. 219—130)

This invention relates to an automatic weld unit control and particularly to a mechanical follower for sensing the direction of a weld line between two adjoining surfaces for continuous and positive respositioning of an electrode with respect to the weld line.

In automatic electric arc welding, means must be provided for maintaining the electrode on the weld line. This is particularly important in commercial welding of successive similar parts wherein the weld line may deviate somewhat from workpiece to workpiece. The accuracy and strength of the weld depends upon accurate location of the tip of the electrode with respect to the weld line.

Various electrical, magnetic and mechanical means have been suggested for maintaining the electrode tip in alignment with the weld line. The electrical and magnetic systems have not been widely employed because of their cost. Mechanical means employing a stylus or follower riding in the weld groove to sense the direction of the weld line are relatively simple and inexpensive. A change in the direction of the weld line may be transmitted either directly or through a servo system to the electrode support to continuously locate the electrode with respect to the weld line. For example, United States Patent 2,189,399 discloses various follower constructions adapted to ride in a welding groove to accurately locate the electrode tip.

Heretofore, mechanical following devices have not been completely satisfactory however, particularly for open arc welding. Prior art weld line followers are placed a substantial distance away from the tip of the electrode in order to protect the follower from the intense heat of the arc. Consequently, complicated delay systems must be interposed to allow for the movement of the electrode in accordance with the spacing of the follower to prevent premature respositioning of the electrode. In an open arc welding, spatter may adhere to the follower and give erroneous deflections with respect to the weld line.

The present invention is particularly directed to an improved mechanical weld line stylus or follower which may be placed closely adjacent the electrode tip even when employing open arcs without any great danger of spatter sticking to the tip of the follower.

In accordance with the present invention, the follower terminates in a suitably shaped tip for convenient and accurate riding in the weld groove. The surface of the follower is a high temperature and wear resistant material. Cooling means are also associated with the follower to positively cool the face of the follower and thus prevent spatter from adhering thereto. Applicant has found that with this construction, the follower can be placed within one-half inch of the tip of the electrode and of the resulting arc. Consequently, the electrode may be directly located with a high degree of accuracy in a simple and inexpensive manner.

The drawing furnished herewith illustrates the best mode presently contemplated for carrying out the invention.

Figure 2:
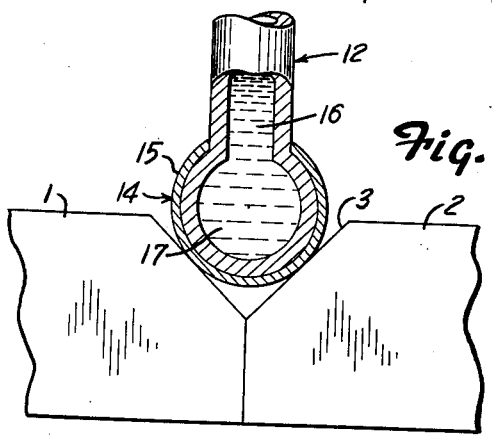

In the drawing:

FIG. 1 is a side elevational view of an automatic arc welding apparatus employing a follower constructed in accordance with the present invention; and FIG. 2 is an enlarged vertical section through a fragmentary portion of FIG. 1 illustrating the internal construction of the follower.

Referring to the drawing and particularly to FIGURES 1 and 2, a pair of abutting plates 1 and 2 are shown having the adjacent upper edges chamfered to define a V-shaped welding groove 3. A welding head 4 is movably mounted on a track 5 immediately above the plates 1 and 2 for movement along the line of groove 3. An electrode 6 is removably carried by a coil 7 on the head 4 which includes suitable feed means 8 for withdrawing the electrode from coil 7 and passing the electrode through a gas shielded arc welding nozzle 9. The nozzle 9 is also suitably secured to head 4 and terminates adjacent the groove 3 to direct the electrode 6 into the groove 3. An arc 10 is established and maintained between the tip of the electrode 6 and the base of the V-shaped groove 3 to continuously deposit the electrode in the groove and form a weld 11.

The nozzle 9 serves to accurately position the tip of the electrode 6 in accordance with the positioning of the welding head 4 on the track 5. The tip of the electrode 6 must be accurately maintained with respect to the welding groove 3 to establish and maintain a proper arc 10 for producing a strong, uniform weld 11.

In accordance with the present invention, a mechanical follower 12 is secured to head 4 and slidably engages groove 3 to position the head in accordance with the line of groove 3. Follower 12 includes a rod-like shank 13 secured to the welding head 4 and an integrally formed groove engaging tip 14. In the illustrated embodiment of the invention, the tip 14 is spherically shaped to establish a low friction sliding contact with the walls of the groove 3 although any other desired configuration can be employed in accordance with the cross-sectional configuration of weld groove 3. The tip 14 rides in the groove 3 and any lateral or vertical movement of the weld groove 3 is transmited through the rod-like shank 13 to the welding head 4 to directly reposition the welding head 4 and the tip of the electrode 6.

In accordance with the present invention, a hard facing 15 is provided on the outer circumference or surface of the tip 14. The facing 15 may be formed of tungsten or similar materials which can operate in high temperature surroundings and is highly wear resistant. Further, a water cooling passageway 16 extends axially through the shank 13 and terminates in a cooling chamber 17 in the groove engaging tip 14. Water or other suitable coolant is circulated through the passageway 16 and chamber 17 to continuously cool the tip 14.

In operation, the welding head 4 is suitably mounted on track 5 for movement in accordance with the line of the V-shaped groove 3. The tip 14 of the follower 12 is positioned within the groove 3 preferably within one-half inch of the arc end of the electrode 6. Power is supplied to the electrode 6 to establish and maintain the arc 10. Simultaneously, the welding head drive, not shown, is energized to move the welding head 4 generally in the path of the welding groove 3, as indicated in FIGURE 1. The follower 12 accurately follows the direction of the welding groove 3 and any change therein is immediately transmitted to the welding head 4. The movement of the welding head 4 directly relocates the electrode 6 to the new position of the weld line.

In this manner, electrode 6 accurately follows the welding grooves in successive workpieces which may vary from workpiece to workpiece because of malfunctioning tolerances and the like.

An electrode follower 12 constructed in accordance with the present invention can be mounted with the groove engaging tip 14 within one-half inch of the arc 10 and consequently provide very rapid and direct repositioning of the electrode 6 with respect to the welding groove 3.

The water cooling of the follower tip 14 essentially prevents spatter or the like from adhering to the tip 14. Consequently, the present invention is particularly adapted for welding with gas shielded arcs or other similar open arcs.

The present invention provides a very simple, inexpensive and long-life mechanical follower for accurately positioning of an electrode in an automatic arc welding unit.

Various modes of carrying out the invention are contemplated as being within the scope of the following claims particularly pointing out and distinctly claiming the subject matter which is regarded as the invention.

I claim:

1. In an arc welding assembly having a welding unit for feeding an electrode to an arc, a follower secured to the welding unit and terminating in a weld line engaging tip closely adjacent the arc end of the electrode, and a cooling passageway in the follower.

2. In an arc welding assembly having a welding unit for feeding an electrode to an arc, a follower secured to the welding unit and terminating in a hard-faced wear-resistant tip closely adjacent the arc end of the electrode, and a cooling passageway in the follower.

3. In an arc welding assembly having a welding unit for feeding an electrode to an arc, a follower secured to the welding unit and terminating in a hard-faced wear-resistant tip closely adjacent the arc end of the electrode, and a cooling passageway in the follower terminating in a chamber within the tip for cooling of the tip.

4. In an arc welding head having an electrode and means for striking and maintaining an arc between an arc end of the electrode and a welding groove in the work, a follower having a tubular shank secured to the welding head and having a spherical tip located to ride in the welding groove within one-half inch of the arc, a high temperature and wear-resistant exterior coating on the spherical tip, and a cooling passageway in the follower terminating within the spherical tip for cooling of the follower.

5. In an arc welding head having means for feeding a consumable electrode through a welding nozzle for striking and maintaining an arc between the tip of the electrode and the work, a follower having a tubular shank secured to the welding head and having a work engaging tip located to ride in the welding groove within one-half inch of the arc, a wear-resistant and high temperature facing on the spherical tip, and a cooling passageway terminating in the spherical tip for supplying cooling of the spherical tip.

6. In an arc welding head having means for feeding a consumable electrode through a welding nozzle and means for striking and maintaining an arc between the arc end of the electrode and a welding groove in the work, a follower having a tubular shank secured to the welding head and having a spherical tip located to ride in the welding groove within one-half inch of the arc, a coating of tungsten carbide on the spherical tip, a cooling passageway in said shank and terminating in a cooling chamber in said spherical tip, and means for connecting the passageway to a coolant.

References Cited in the file of this patent
UNITED STATES PATENTS

| | | |
|---|---|---|
| 1,079,073 | Swanson et al. | Nov. 18, 1913 |
| 2,189,399 | Lewbers | Feb. 6, 1940 |
| 2,441,507 | Peters | May 11, 1948 |